(12) United States Patent
Nix

(10) Patent No.: US 8,901,758 B1
(45) Date of Patent: Dec. 2, 2014

(54) GRAVITY POWERED ELECTRICITY GENERATOR

(76) Inventor: J. Douglas Nix, Ft Garland, CO (US)

( * ) Notice: Subject to any disclaimer, the term of this patent is extended or adjusted under 35 U.S.C. 154(b) by 390 days.

(21) Appl. No.: 13/457,327

(22) Filed: Apr. 26, 2012

Related U.S. Application Data

(63) Continuation of application No. 12/386,326, filed on Apr. 16, 2009, now abandoned.

(51) Int. Cl.
*F02B 63/04* (2006.01)

(52) U.S. Cl.
USPC .......................................... 290/1 R; 290/1 A

(58) Field of Classification Search
USPC ................................................... 290/1 R, 1 A
See application file for complete search history.

(56) References Cited

U.S. PATENT DOCUMENTS

| | | | | |
|---|---|---|---|---|
| 6,051,892 A | * | 4/2000 | Toal, Sr. ........................ | 290/43 |
| 8,030,790 B2 | * | 10/2011 | Kamenov ....................... | 290/43 |
| 8,127,542 B1 | * | 3/2012 | Dolcimascolo ................ | 60/398 |
| 2011/0241354 A1 | * | 10/2011 | Khoshnevis et al. ............ | 290/1 |

* cited by examiner

*Primary Examiner* — Nicholas Ponomarenko
(74) *Attorney, Agent, or Firm* — Ramon L. Pizarro; Edwin H. Crabtree

(57) ABSTRACT

A system and method for reducing the energy used from an electric grid by providing electrical energy from non-grid sources and exchanging thermal energy with the structure. The system includes at least one weight that is connected to sprocket and generator that is turned when the weight is lowered into a shaft, so that electricity is generated, and then the weight is returned to starting position by using the generator as an electric motor and raising the weight using electrical energy from the solar panel or the wind generator. The system also takes advantage of the depth of the shaft to add a heat exchange system that is used to control the temperature within the structure.

7 Claims, 2 Drawing Sheets

GRAVITY POWERED ELECTRICITY GENERATOR

REFERENCE TO RELATED APPLICATIONS

This application is a continuation of my non-provisional patent application titled "GRAVITY POWERED ELECTRICITY GENERATOR", filed on 16 Apr. 2009 with Ser. No. 12/386,326, incorporated herein in its entirety by reference.

BACKGROUND OF THE INVENTION (a) Field of the Invention

This application relates to a system for using a weight to generate electricity in conjunction with other sources of energy for returning the weight to its initial elevated state. More particularly, but not by way of limitation, to a system that uses the lowering of a weight to generate electricity, and then takes advantage of a variety of energy sources to return the weight to its initial elevation, and thus the system can be used to provide or supplement the electrical energy needs of a home or other structure.

(b) Discussion of Known Art

The fact that the potential energy of a weight at a height can be converted into electrical energy is well known. An example of this fact is the well-known hydroelectric power plant. However, the use of this principle in remote, arid or semi-arid areas is often impractical or impossible due to the lack of a source of flowing water.

Other known energy sources include solar power, which typically takes advantage of the known photovoltaic effect. The disadvantage of this source of power is that it can only by used on sunny days or sunny areas.

Yet another known source of energy for conversion into electrical energy is the wind. Wind energy, like solar energy, depends on the right weather conditions in order to be effective. If there is no wind, then the wind turbine will not be able to produce electrical energy. Another significant limitation of the use of wind turbines is that some wind turbines typically require the use of very large blades to achieve the amount of torque needed for adequate power generation. Other wind turbine designs require the use of tall towers that hold the turbine in the wind stream. These designs are generally too tall for many residential areas conflicting with covenants or code. Thus, space and height requirements make it impractical for a homeowner to rely on wind energy to provide electrical power to a home.

Therefore, a review of known devices reveals that there remains a need for a system that alleviates the problem of being dependent of weather conditions for the generation of electrical, and which can be easily installed on a relatively modestly sized parcel of land.

SUMMARY

It has been discovered that the problems left unanswered by known art can be solved by providing a system for generating electricity, the system being mounted on a surface, typically ground level, and includes:

At least one weight, the weight being connected to a spool or sprocket that is in turn connected to a generator that can be used as an electric motor, the connection between the weight and the spool being a flexible support that tethers the weight to the spool, the weight being supported within a shaft that extends below ground level;

An energy converter that converts solar or wind energy into electrical energy, the energy converter being electrically coupled to the generator that can be used as an electric motor, so that electricity is generated by allowing the weight to be lowered into the shaft so that the spool rotates by the passing of the flexible connector over the spool as the weight is lowered, and the spool in turn rotates the generator to generate electricity, and then the weight is returned to starting position by using the generator as an electric motor and raising the weight using electrical energy from the solar panel or the wind generator.

It is contemplated that a gearbox may be mounted between the generator and the spool. This would allow the raising of the weight in situations where neither wind nor solar power generators are able to produce enough power to raise the weight quickly.

Thus, according to a preferred embodiment, electricity generation process uses the effect of the force of gravity on weights suspended by a chain that is draped over a sprocket. The sprocket is mounted on a horizontal primary drive shaft, which is then turned by the weight pulling the chain along the sprocket. Mounted separately on the same primary drive shaft is a large driven gear that meshes with a small gear. The small gear is mounted on the drive shaft of an induction generator. This gear drives the induction generator, which produces alternating current (AC) for immediate use or sale (return to a commercial power grid). As discussed above, the weights are returned to their starting position by one or a possible combination of means.

The basic configuration for this preferred embodiment of the system would include a set of three shafts, weights, gears and induction generators. The three different weight sets would be at different cycles. When one weight reaches the bottom of the shaft it can then be returned to the top of the shaft using an AC motor that utilizes energy either from the other two induction generators, AC power from the commercial grid, or a bank of DC batteries powered by a solar panel grid (converted to AC) or a wind turbine that is configured to generate electricity. In this example, each AC motor is used specifically for the weight retrieval purpose.

The power produced by the three gravity driven induction generators is equal to the power produced by three wind turbine generators running constantly utilizing the same size induction generators minus the power consumed by the AC motor to return the weights to the top of their shafts. The gravity driven generators would run constantly without dependency on wind or exposure to the sun's energy. The net production of AC power for a home or business can be substantial. If a solar panel power is utilized to return the weights to the top of their shaft then a maximum net gain in AC power production is realized.

The weights will need a determined distance of travel in order to achieve efficiency of operation. The mass of the weights themselves will be determined by the size of the induction generator, i.e., the energy required to produce enough torque to turn the drive shaft of the generator at its optimum RPM. It is also assumed that each primary drive shaft may turn more than one driven gear providing the ability to power two or more generators simultaneously depending on the weights utilized. In most instances the drilling of a six-inch diameter shaft is much easier and/or cheaper to achieve than drilling a large diameter shaft. In this (or most) cases, drilling multiple shafts would be the best option, especially in regard to operational redundancy or maximizing power production.

In a commercial building the vertical travel of a weight could be carried out in an elevator shaft or vertical ducting that provides ample space for free travel of the weights in the vertical plane. The shafts could also be constructed on the exterior of a multi-story building with protective construct. An example of the disclosed invention could be used in retired grain elevators for producing electrical power. The application of appropriate weights and gear sizes relative to the motor drive shaft torque requirements and induction generator selection will vary per site requirements.

In a residential application where above ground construction of weight shafts may be restricted by municipal, other codes or practicality, the shafts may be drilled a determined distance into the ground. In these applications, a shed may be constructed to house the generator and drill shaft access. Of course, the drilling of shafts must be accomplished while respecting any applicable municipality without restriction to residential application. The number of shafts needed for a specific application will be determined on a case-by-case basis taking into account any relative factors.

It is also contemplated that actuators will be placed near both ends of the drive chains in order to signal whether to initiate and terminate utilization of the AC motor to return the weight to the top of the shaft. As the weight nears the bottom of it's shaft, an actuator mounted on the chain will engage the AC motor drive pulling the weight back up the shaft. As the weight approaches the top of the shaft, the other actuator disengages the motor drive thus beginning the production of more AC energy until the weight nears the bottom of the shaft once again. The time it takes to bring the weight to the top of the weight shaft is much shorter than the time or cycle of power generation during which the weight travels toward the bottom of the shaft. Offset of the production cycle or phase of multiple motors or sets of motors would be utilized to avoid both or multiple motor power requirements from occurring simultaneously. If a solar panel array is utilized to supplement the motor power requirements for weight retrieval then a DC motor may be used in place of an AC motor. However, a DC/AC power inverter on the solar collector system may be best option so that commercial grid AC power may be used to drive the weight retrieval motors in the instance of prolonged absence of solar power production, i.e., heavy cloud cover or battery array failure.

Multiple vertical shafts and motors must be utilized to provide redundancy of operation in the event of an induction generator failure and to achieve net gains in power production. Any number of drill shafts or weight shafts may be utilized to increase power production capacity. This also provides the ability of one generator set to utilize the electrical power produced by another generator set while pulling it's respective weight to the top of it's weight shaft as mentioned earlier.

It is also contemplated that the drill shafts may be utilized not only to house the travel path of weights, but also to house tubing used for thermal transfer in geothermal enhancements of HVAC systems. This then illustrates a marked advantage to using drill shafts as opposed to existing structure available space. In the event of a pre-existing residential structure or the impracticality of excavating on a property, or to take advantage of geothermal sciences, tubing can be placed in a coiled fashion predominantly at the bottom of the drilled shaft. The ingress of the tubing could occur directly down the shaft from the top of the shaft creating pressure, which can be utilized in the coolant substance egress from the shaft back into the HVAC system. The coiled tubing at the bottom of the shaft will slow the progress of the fluid to allow for thermal transfer. Placement of heat conduction enhancers, such as pebbles against the coil near the bottom of the shaft may enhance the efficiency of thermal transfer within the inner diameter of the tubing coil, which should accelerate the thermal transfer. The external wall or diameter of the shaft provides thermal transfer on the external diameter. A low voltage motor contained at or near the HVAC system may be utilized to assist (fluid pressure) in transfer of the fluid from the bottom of the weight shaft along or through an angled ascent return conduit to as near the serviced structure as possible, then to the HVAC system.

Still further, the geothermal conductance produced inherently in drill shafts may also be channeled or utilized to heat/cool attic space or rooftops. This can enhance HVAC system effectiveness, melt snow which can be stored in subterrain cisterns (along with rainwater) for lawn watering in warm months or be utilized to cool rooftops which may additionally increase a rooftops resistance to fire hazard from external sources.

It should also be understood that while the above and other advantages and results of the present invention will become apparent to those skilled in the art from the following detailed description and accompanying drawings, showing the contemplated novel construction, combinations and elements as herein described, and more particularly defined by the appended claims, it should be clearly understood that changes in the precise embodiments of the herein disclosed invention are meant to be included within the scope of the claims, except insofar as they may be precluded by the prior art.

DRAWINGS

The accompanying drawings illustrate preferred embodiments of the present invention according to the best mode presently devised for making and using the instant invention, and in which.

DETAILED DESCRIPTION OF PREFERRED EXEMPLAR EMBODIMENTS

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention.

Figure 1:
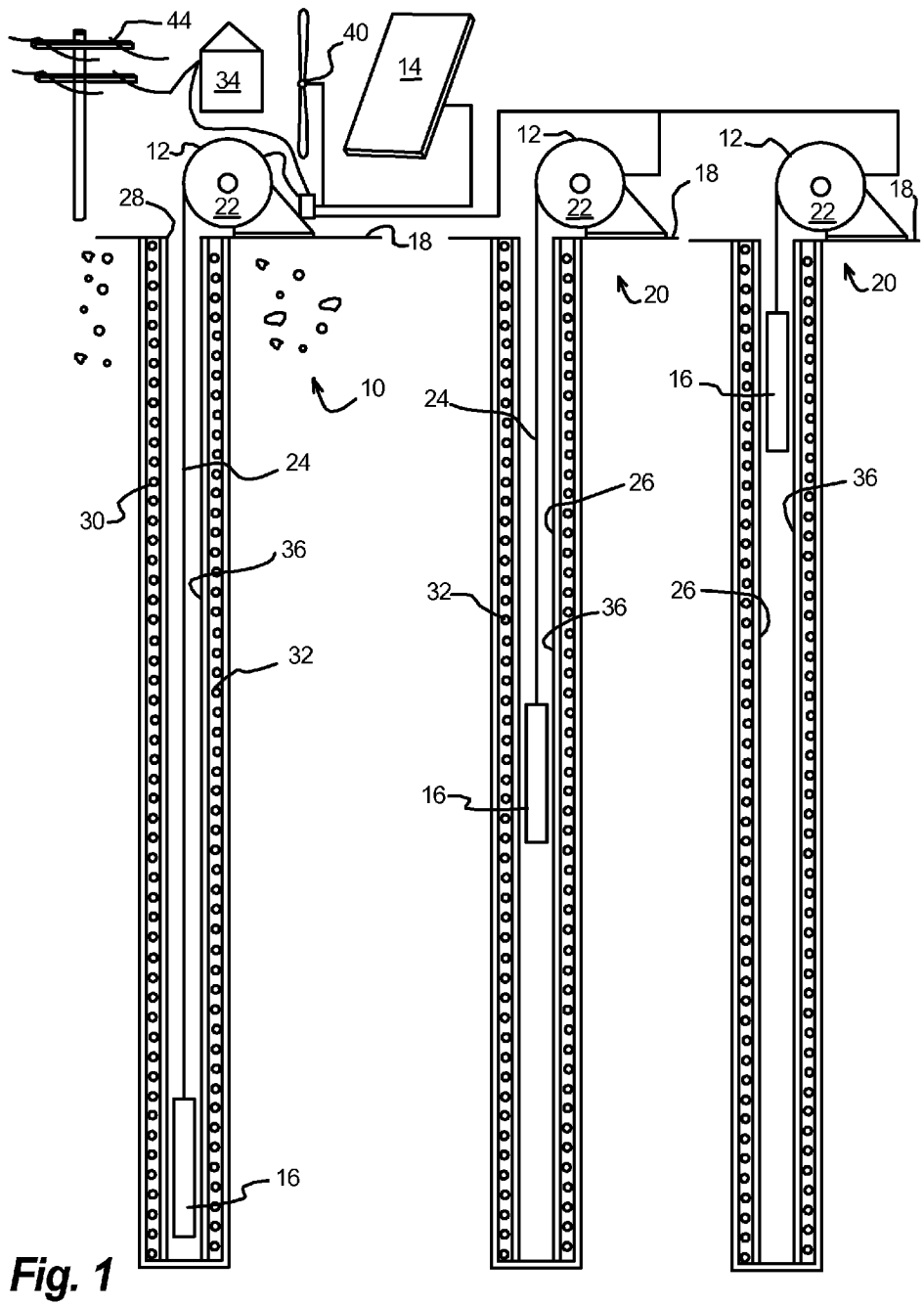
FIG. 1 is a schematic illustrating the primary components of the disclosed invention.

Turning now to FIG. 1 where the primary components of system 10 for generating electricity. An important aspect of the disclosed system is the use of gravity as the genesis for the force that turns a generator 12 to generate electricity. One advantage of using gravity is that it allows the disclosed system 10 to be concealed due to the fact that important components of the disclosed invention are installed underground. Concealment of the disclosed system can be easily achieved by building a shed or similar structure around the installation. Another advantage is that it utilizes energy collected from sources and then allows the release of this energy at a high rate, and thus improving the usefulness of a variety of energy sources. Thus the disclosed system collects electrical energy from solar panels 14, which use the well-known photovoltaic effect to generate electricity, and then stores this energy for later use in raising a weight 16 that is used to drive the generator 12.

Accordingly, FIG. 1 illustrates that the system 10 built on a surface 18 at ground level, or what is designated as a starting level. FIG. 1 also illustrates that multiples of the system 10 may be used together, preferably with each example being out of phase with others, so as to create a desired current output for the multiple installations 20 of the weight activated generator 12.

Thus, each installation of the system 10 includes at least one weight 16. Each of the weights 16 is connected to a spool or sprocket 22 that is in turn connected to the generator 12. It is contemplated that the sprocket 22 may be connected to the generator 12 through a gearbox or transmission that allows selection of the amount of reduction between the sprocket 22 and the generator 12. In a preferred embodiment a drive chain 24 connects the weight 16 to the sprocket 22. This drive chain 24 may be collected in various manners as the weight is raised. The collection may be by allowing the chain to fall into a containment area or by spooling the chain. It is also contemplated that cable may also be used instead of the chain 24, and if using cable, a spool may be used to take up the cable as the weight is raised.

Figure 2:
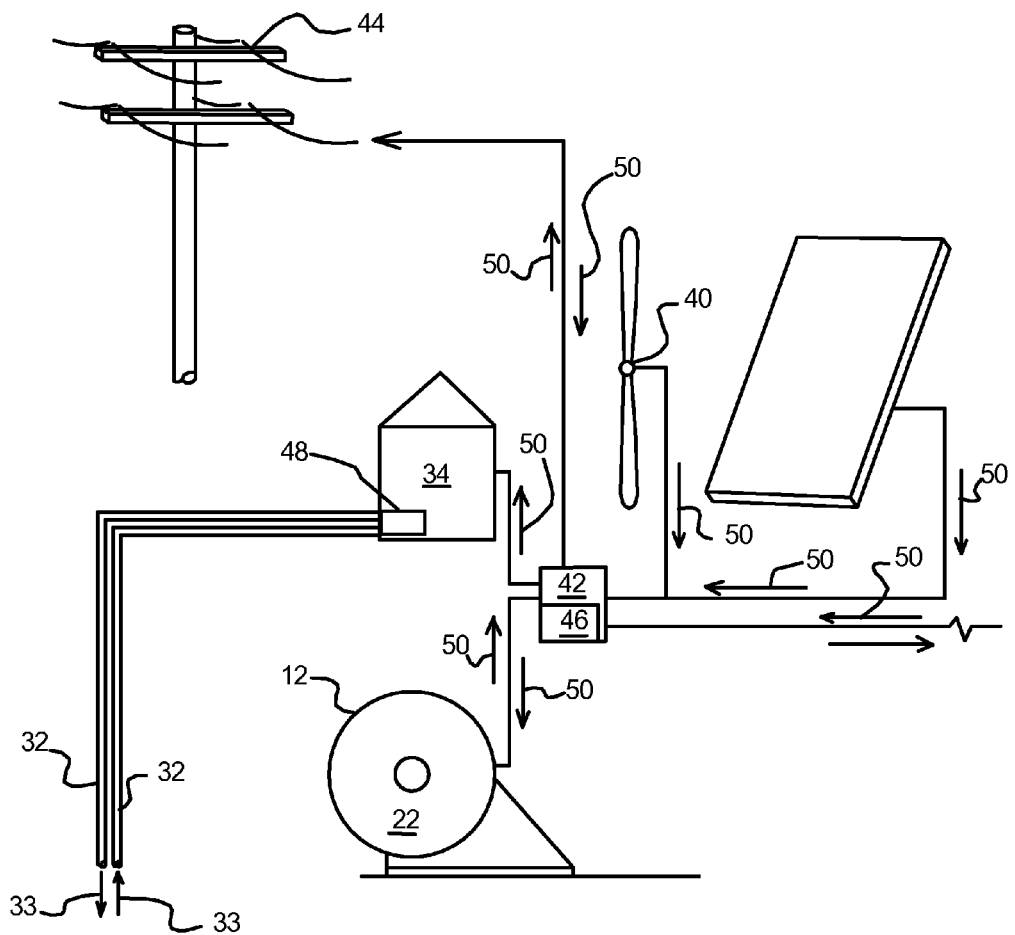
FIG. 2 is details components illustrated in FIG. 1.

It will be understood that, as shown on FIGS. 1 and 2, the generator 12 may also be used as an electric motor, in a manner well understood in the art. However it is also contemplated that separate motor and generator devices may also be used with the disclosed system in order to provide devices that have been optimized for their perspective functions. Thus it is also contemplated that the connection of such two devices to the sprocket 22 could be accomplished by using a transmission and clutch mechanism, or a transmission and switching system that would isolate the motor or the generator when one or the other is in operation.

As illustrated in FIG. 1, it is contemplated that the weight 16 will travel into and from a containment area, which in a preferred embodiment of the invention is a shaft 26 that has been drilled below ground level 18. The generator 12 and mechanism used to allow lowering and retrieval of the weight 16 will be positioned next to the entrance 28 of the shaft 26. The total depth of the shaft is determined by the power generation requirements of the system, and is contemplated as providing extra depth to allow collection of water or other debris that may inadvertently collect in the shaft 26.

FIG. 1 also illustrates that it is contemplated that a heat exchanger 30 may be incorporated into the sides 36 of the shaft 26. In the illustrated example the heat exchanger 30 consists of tubing 32 that has been wound around the shaft 26, however it is also contemplated that the tubing 32 may be accommodated down along the sides 36 of the shaft 26. It is contemplated that the tubing 32 will be used to deliver a working fluid 33 into the shaft for the purpose of using the difference in temperature of the underground soil and the interior of the house or structure 34 that is be connected to the disclosed system 10. It is contemplated that the working fluid will be pumped through the tubing surrounding each shaft 26 and then through a home heat exchanger 48 that is used to heat or cool the interior of the structure 34, depending on the temperature inside the structure.

FIG. 1 also illustrates that a wind turbine 40 can be added to the disclosed system in order to provide electrical energy at times when the solar panel 14 cannot provide sufficient power to raise the weights being used. Additionally, because the power production from the solar panel 14 and the wind 40 may be inconsistent, it is contemplated that the power produced by these devices will be first delivered to a set of batteries 42 through a power management unit 46 that will control distribution of power in the system 10. Arrows 50 on FIG. 2 indicate the direction of flow of electrical power. Power that is not used or needed for charging batteries, for example, will then be used to raise the weights. Excess energy, which exceeds the amount to be stored in the batteries 42, may then first be used to meet needs in the structure 34, or may then be returned to the power grid 44, to be transmitted to other locations. Also, while it is contemplated that the amount of power produced through the disclosed system may be tailored by incorporating several shafts 26, each equipped with the components of the system disclosed here. Each installation would then be used to generate electricity as disclosed here, preferably in offset phases. Because it is contemplated that the disclosed system will allow the building to remain connected to the power grid 44, the disclosed system will not interfere with the ability to provide constant power to the building, in the event of a failure of the system to provide the needed power.

It can be appreciated that the above-described embodiments are illustrative of just a few of the numerous variations of arrangements of the disclosed elements used to carry out the disclosed invention. Moreover, while the invention has been particularly shown, described and illustrated in detail with reference to preferred embodiments and modifications thereof, it should be understood that the foregoing and other modifications are exemplary only, and that equivalent changes in form and detail may be made without departing from the true spirit and scope of the invention as claimed, except as precluded by the prior art.

What is claimed is:

1. A system for generating electricity, the system being mounted on a surface at ground level, the system comprising:
at least one weight, the weight being connected to a spool that is in turn connected to a generator and to an electric motor, the connection between the weight and the spool being a flexible support that tethers the weight to the spool, the weight being supported within a shaft that extends down, below the generator;
tubing positioned next to the shaft, the tubing being connected to a home heat exchanger; and
at least one energy converter that converts solar or wind energy into electrical energy, the energy converter being electrically coupled to the generator that can be used as an electric motor, so that electricity is generated by allowing the weight go down into the shaft so that the spool rotates by the passing of the flexible support over the spool as the weight goes down, and the spool in turn rotates the generator to generate electricity, and then the weight is returned to starting position by using the electric motor to raise the weight using electrical energy collected from outside of a power grid.

2. A system according to claim 1 wherein the tubing is positioned next to and longitudinally along the shaft, so that the temperature along the shaft can be used to exchange heat energy from.

3. A system for generating electricity for use in a structure, the system being mounted on a surface at ground level, the system comprising:
at least one weight, the weight being connected to a spool that is in turn connected to a generator that can be used as an electric motor, the connection between the weight and the spool being a flexible support that tethers the weight to the spool, the weight being supported within a shaft that extends below ground level;
tubing positioned next to the shaft, the tubing being connected to a home heat exchanger; and
at least one energy converter that converts solar or wind energy into electrical energy, the energy converter being electrically coupled to the generator that can be used as an electric motor, so that electricity is generated by allowing the weight go down into the shaft so that the spool rotates by the passing of the flexible support over the spool as the weight goes down, and the spool in turn rotates the generator to generate electricity, and then the weight is returned to starting position by using the generator as an electric motor and raising the weight using electrical energy from the solar panel or the wind generator.

4. A system according to claim 3 wherein the tubing is positioned next to and along the shaft, the tubing being connected to a home heat exchanger, so that the temperature along the shaft can be used to exchange heat energy.

5. A method for reducing the amount of energy consumed from an electric grid by a structure, the method comprising:
   providing a system on a surface at ground level, the system comprising:
   at least one weight, the weight being connected to a spool that is in turn connected to a generator that can be used as an electric motor, the connection between the weight and the spool being a flexible support that tethers the weight to the spool, the weight being supported within a shaft that extends below ground level;
   positioning tubing next to the shaft, and connecting the tubing to a home heat exchanger in the structure, so that the temperature along the shaft can be used to exchange heat energy within the structure; and
   at least one energy converter that converts solar or wind energy into electrical energy, the energy converter being electrically coupled to the generator that can be used as an electric motor;
   generating electricity by allowing the weight go down into the shaft from a starting level so that the spool rotates by the passing of the flexible support over the spool as the weight goes down, and the spool in turn rotates the generator to generate electricity;
   returning the weight to the starting level by using the generator as an electric motor and raising the weight using electrical energy from the solar panel or the wind generator.

6. A method according to claim 5, wherein the tubing is positioned next to and longitudinally along the shaft.

7. A method according to claim 6 wherein the tubing is in a spiral along the shaft.

* * * * *